Figure 1:
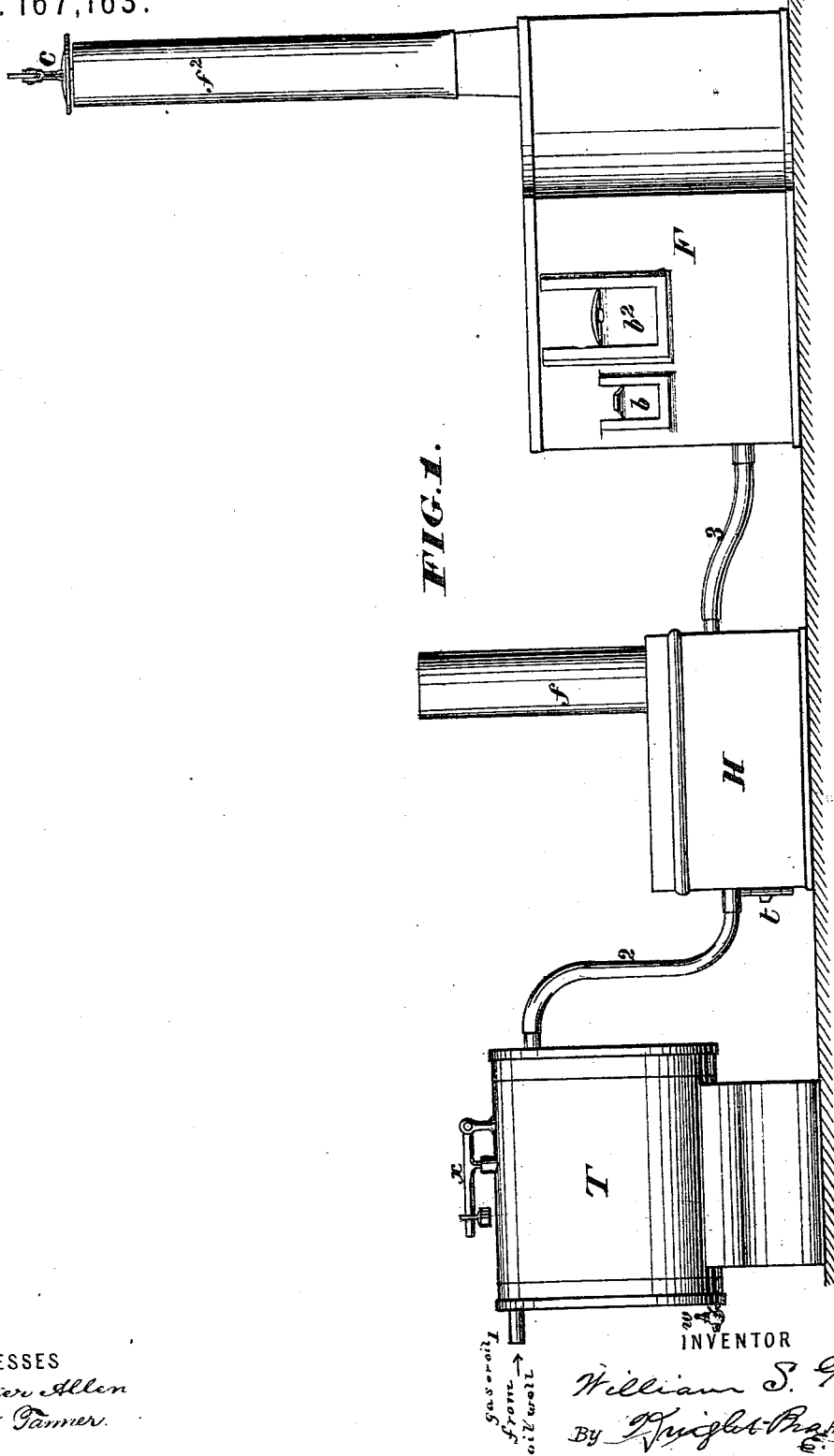

W. S. GILLEN.
Apparatus for Preparing Oil-Well Gas for Heating Furnaces.

No. 167,163.  
2 Sheets--Sheet 1.  
Patented Aug. 31, 1875.

WITNESSES  
Walter Allen  
H. T. Farmer.

INVENTOR  
William S. Gillen  
By Knight Bro. Attorneys

W. S. GILLEN.
Apparatus for Preparing Oil-Well Gas for Heating Furnaces.
No. 167,163. Patented Aug. 31, 1875.
2 Sheets--Sheet 2.
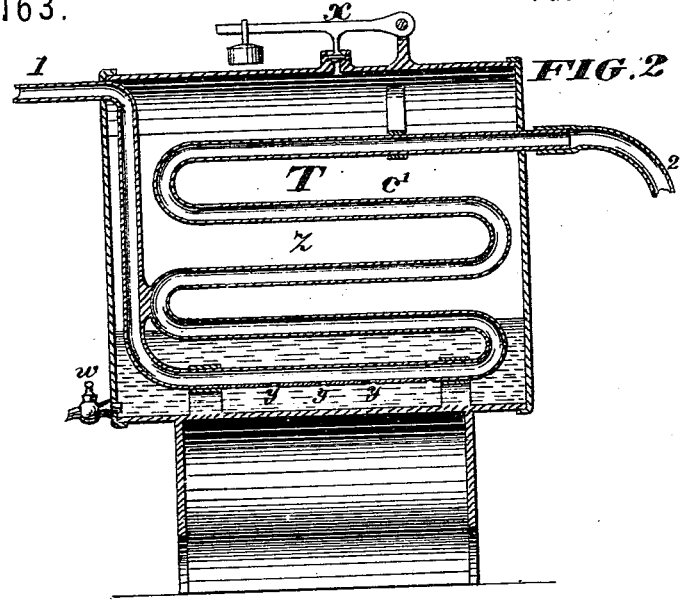
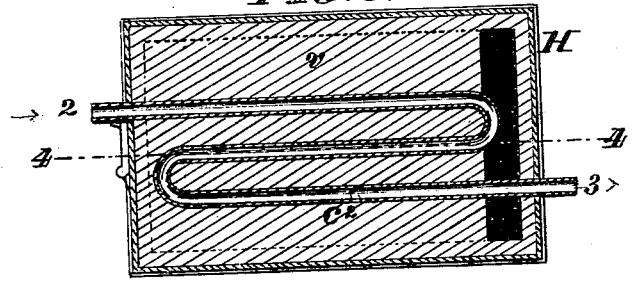
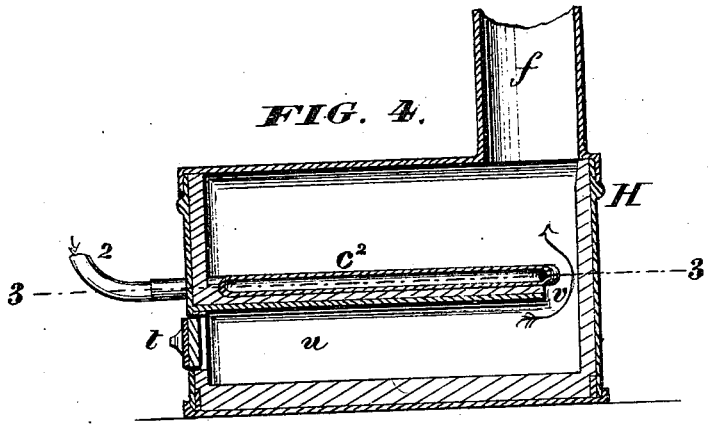
WITNESSES
Walter Allen
H. P. Tanner
INVENTOR
William S. Gillen
By Knight Bros. Attorneys

UNITED STATES PATENT OFFICE.

WILLIAM S. GILLEN, OF PITTSBURG, PENNSYLVANIA, ASSIGNOR TO HIMSELF AND JAMES D. BOAL, OF SAME PLACE.

IMPROVEMENT IN APPARATUS FOR PREPARING OIL-WELL GAS FOR HEATING FURNACES.

Specification forming part of Letters Patent No. 167,163, dated August 31, 1875; application filed May 22, 1874.

*To all whom it may concern:*

Be it known that I, WILLIAM S. GILLEN, of the city of Pittsburg, in the county of Allegheny and State of Pennsylvania, have invented an Improved Apparatus for Preparing Oil or Gas from Oil-Wells for use in Heating Metallurgic or other Furnaces, of which the following is a specification:

The invention consists in the employment or use of a trap to separate free water or watery particles from the gas or oil, as hereinbefore described.

In the accompanying drawings, Figure 1 is a side elevation of apparatus, illustrating this invention as applied to a puddling-furnace. Fig. 2 is a vertical longitudinal section on a larger scale, representing the trap for separating free water from the gas or oil. Fig. 3 is a horizontal section of the heater. Fig. 4 is a vertical longitudinal section on the line 4 4, Fig. 3.

At many oil-wells a continuous and abundant discharge of impure hydrocarbon oil or gas takes place, and numerous methods have been devised for utilizing this discharge.

In order to prepare such gas or oil for use in furnaces for the manufacture of iron or steel, preferably, I first pass the gas or oil, by means of a pipe, 1, through a trap, T, in which the free water is allowed to escape from the gas or oil. From this the gas or oil is conducted by a pipe, 2, to a heater or series of heaters, H, and from the latter the heated gas or oil is conducted by a pipe, 3, to a burner of proper construction within a furnace, F. The trap T has within it a large water-chamber, $z$, through which the pipe 1, leading from the well or source of supply, extends in a vertical coil, $c'$. The gas or oil first passes to the bottom of the coil, which is provided with perforations $y$ for the escape of water. From this part of the coil the gas or oil flows upward, and is discharged into the pipe 2 at the top of the trap. A safety-valve, $x$, is provided at the top of the trap T, to protect the same against undue pressure in the event of any leakage or displacement of the pipe within it. A cock or plug, $w$, is provided at the bottom of the trap for drawing off the water.

The shell of the trap is made of boiler-iron. The coil and valves may be of any approved materials.

After passing through the trap the gas or oil is also heated to a point at or near that at which the most perfect combustion takes place, and is fed into the furnace in this condition, ready to ignite and to burn with the best effect. The heating operates also to impel the gas or oil forward by expansion with such force as to obviate any necessity for forcing jets to inject it.

In the case of gas, an important effect of the heating is to prevent condensation in the pipes.

By multiplying heaters at distances of about one hundred feet apart, the gas may be conveyed to distant points.

In the case of oil, the heaters operate to vaporize the same, and, if necessary, to preserve and superheat the vapor.

The furnace F may be of any approved form which is or may be used in the manufacture of iron and steel. A puddling-furnace is represented in Fig. 1. The stack $f^2$ extends from the rear end of the furnace.

The gas or oil escaping naturally from oil-wells, and consequently very cheap, is, by my apparatus, adapted to be employed with perfect success in all the operations of manufacturing iron and steel. This has not been practically accomplished prior to my invention by any means with which I am acquainted. The watery element in the escaping gas or oil renders it entirely unfit for introduction in its natural state into a furnace of the description named.

The preliminary drying process, as it may be termed, lessens the amount of water which passes into the heater, and the peculiar trap or reservoir T, in which this is accomplished, operates to this end in superior manner, while it operates also to regulate or equalize the pressure of the gas or oil as it flows in pulsations from the well, and to prevent injury to the apparatus by sudden enormous increase of pressure.

The following is claimed as new:

The trap T, having oil-and-water-pipe coil $c$ partially immersed in water, and having perforations $y$ in the immersed bottom of the coil for the escape of water therefrom, substantially as herein shown and described.

W. S. GILLEN.

Witnesses:
JAS. L. EWIN,
WALTER ALLEN.